(12) United States Patent
Cheng et al.

(10) Patent No.: US 11,867,874 B2
(45) Date of Patent: *Jan. 9, 2024

(54) INSERT MATERIALS WITH HIGH OXYGEN PERMEABILITY AND HIGH REFRACTIVE INDEX

(71) Applicant: Alcon Inc., Fribourg (CH)

(72) Inventors: Jing Cheng, Suwanee, GA (US); Wei Liang, Johns Creek, GA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 386 days.

This patent is subject to a terminal disclaimer.

(21) Appl. No.: 17/205,169

(22) Filed: Mar. 18, 2021

(65) Prior Publication Data

US 2021/0302625 A1 Sep. 30, 2021

Related U.S. Application Data

(60) Provisional application No. 62/991,724, filed on Mar. 19, 2020.

(51) Int. Cl.
| | | |
|---|---|---|
| *G02B 1/04* | (2006.01) | |
| *C08G 77/06* | (2006.01) | |
| *C08G 77/32* | (2006.01) | |
| *C08J 3/24* | (2006.01) | |

(52) U.S. Cl.
CPC .............. *G02B 1/043* (2013.01); *C08G 77/06* (2013.01); *C08G 77/32* (2013.01); *C08J 3/246* (2013.01); *C08G 2210/00* (2013.01); *C08G 2270/00* (2013.01); *C08J 2383/04* (2013.01); *C08J 2433/08* (2013.01)

(58) Field of Classification Search
CPC .................................................... G02B 1/043

See application file for complete search history.

(56) References Cited

U.S. PATENT DOCUMENTS

| | | |
|---|---|---|
| 3,488,111 A | 1/1970 | Sen |
| 4,136,250 A | 1/1979 | Mueller et al. |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,268,132 A | 5/1981 | Neefe |
| 4,276,402 A | 6/1981 | Chromecek et al. |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,929,693 A | 5/1990 | Akashi |
| 4,954,586 A | 9/1990 | Toyohima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,098,546 A | 3/1992 | Kawashima et al. |
| 5,156,726 A | 10/1992 | Nakada et al. |
| 5,166,345 A | 11/1992 | Akashi |

(Continued)

FOREIGN PATENT DOCUMENTS

| | | |
|---|---|---|
| CN | 104011110 A | 8/2014 |
| CN | 105949466 A | 9/2016 |

(Continued)

OTHER PUBLICATIONS

K. J. Sax, et al. "Preparation and Infrared Absorption Spectra of Some Phenyl Ethers", published in J. Org. Chem., 1960, vol. 25 (9), pp. 1590-1595.

*Primary Examiner* — Michael F Pepitone
(74) *Attorney, Agent, or Firm* — Jian Zhou

(57) ABSTRACT

The invention is generally related to an insert for being embedded in a silicone hydrogel contact lens. The insert is made of a crosslinked materials which are rigid in dry state at room temperature (from about 22° C. to about 26° C.), have a high oxygen permeability and a high refractive index in fully hydrated state, and can become softer at a temperature great than 32° C. Such materials are useful for making inserts in embedded contact lenses for correcting corneal astigmatism, presbyopia, and color blindness lenses and for imparting photochromic characteristics to the lenses. The (Continued)

invention is also related to a method for making embedded silicone hydrogel contact lenses comprising an insert of the invention therein and to embedded silicone hydrogel contact lenses comprising an insert of the invention therein.

18 Claims, No Drawings

(56) References Cited

U.S. PATENT DOCUMENTS

| | | | |
|---|---|---|---|
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,017,121 A | 1/2000 | Chateau |
| 6,019,914 A | 2/2000 | Lokshin |
| 6,039,913 A | 3/2000 | Hirt et al. |
| 6,113,814 A | 9/2000 | Gemert |
| 6,149,841 A | 11/2000 | Kumar |
| 6,166,236 A | 12/2000 | Bambury |
| 6,296,785 B1 | 10/2001 | Nelson |
| 6,348,604 B1 | 2/2002 | Nelson |
| 6,762,264 B2 | 7/2004 | Kuenzler et al. |
| 6,851,805 B2 | 2/2005 | Blum et al. |
| 6,867,245 B2 | 3/2005 | Iwata et al. |
| 7,214,809 B2 | 5/2007 | Zanini et al. |
| 7,322,694 B2 | 1/2008 | Dahi et al. |
| 7,423,074 B2 | 9/2008 | Lai |
| 7,490,936 B2 | 2/2009 | Blum et al. |
| 7,556,750 B2 | 7/2009 | Xiao |
| 7,584,630 B2 | 9/2009 | Van Gemert |
| 7,605,190 B2 | 10/2009 | Moszner et al. |
| 7,883,207 B2 | 2/2011 | Iyer |
| 7,999,989 B2 | 8/2011 | Asai |
| 8,154,804 B2 | 4/2012 | McGinn |
| 8,158,037 B2 | 4/2012 | Chopra |
| 8,215,770 B2 | 7/2012 | Blum |
| 8,348,424 B2 | 1/2013 | Pugh |
| 8,415,405 B2 | 4/2013 | Maggio |
| 8,475,529 B2 | 7/2013 | Clarke |
| 8,480,227 B2 | 7/2013 | Qiu |
| 8,529,057 B2 | 9/2013 | Qiu |
| 8,614,261 B2 | 12/2013 | Iwata et al. |
| 8,658,748 B2 | 2/2014 | Liu et al. |
| 8,697,770 B2 | 4/2014 | Duis |
| 8,741,188 B2 | 6/2014 | Chopra |
| 8,835,525 B2 | 9/2014 | Kuyu |
| 8,874,182 B2 | 10/2014 | Etzkorn et al. |
| 8,900,297 B2 | 12/2014 | Schlueter |
| 8,993,651 B2 | 3/2015 | Chang |
| 9,052,438 B2 | 6/2015 | Xiao |
| 9,097,840 B2 | 8/2015 | Chang et al. |
| 9,097,916 B2 | 8/2015 | Chopra et al. |
| 9,103,965 B2 | 8/2015 | Chang |
| 9,176,332 B1 | 11/2015 | Etzkorn et al. |
| 9,217,813 B2 | 12/2015 | Liu |
| 9,465,234 B2 | 10/2016 | Chopra et al. |
| 9,475,827 B2 | 10/2016 | Chang et al. |
| 9,618,773 B2 | 4/2017 | Clarke |
| 9,904,074 B2 | 2/2018 | Duis et al. |
| 10,064,977 B2 | 9/2018 | Jiang et al. |
| 10,081,697 B2 | 9/2018 | Huang et al. |
| 10,197,707 B2 | 2/2019 | Xiao et al. |
| 10,203,521 B2 | 2/2019 | Pugh et al. |
| 10,209,534 B2 | 2/2019 | Alli et al. |
| 10,301,451 B2 | 5/2019 | Jing et al. |
| 10,465,047 B2 | 11/2019 | Jing et al. |
| 11,618,823 B2 * | 4/2023 | Cheng ............... C08L 83/06 523/107 |
| 2004/0141150 A1 | 7/2004 | Roffman et al. |
| 2004/0212779 A1 | 10/2004 | Dahi et al. |
| 2008/0208335 A1 | 8/2008 | Blum et al. |
| 2009/0091818 A1 | 4/2009 | Haddock et al. |
| 2009/0244477 A1 | 10/2009 | Pugh et al. |
| 2010/0072643 A1 | 3/2010 | Pugh et al. |
| 2010/0076553 A1 | 3/2010 | Pugh et al. |
| 2011/0157544 A1 | 6/2011 | Pugh et al. |
| 2012/0120365 A1 | 5/2012 | Legerton et al. |
| 2012/0140167 A1 | 6/2012 | Blum |
| 2012/0220743 A1 | 8/2012 | Francis et al. |
| 2012/0234453 A1 | 9/2012 | Pugh et al. |
| 2014/0206830 A1 | 7/2014 | Parakka et al. |
| 2014/0276481 A1 | 9/2014 | Pugh et al. |
| 2015/0145155 A1 | 5/2015 | Pugh et al. |
| 2017/0166673 A1 | 6/2017 | Huang et al. |
| 2018/0011223 A1 | 1/2018 | Alli et al. |
| 2019/0085000 A1 | 3/2019 | Hyun et al. |

FOREIGN PATENT DOCUMENTS

| | | |
|---|---|---|
| CN | 108699244 A | 10/2018 |
| EP | 0632329 A1 | 1/1995 |
| TW | 201734065 A | 10/2017 |
| TW | 201815977 A | 5/2018 |

* cited by examiner

INSERT MATERIALS WITH HIGH OXYGEN PERMEABILITY AND HIGH REFRACTIVE INDEX

This application claims the benefit under 35 USC § 119 (e) of U.S. provisional application No. 62/991,724 filed 19 Mar. 2020, herein incorporated by reference in its entirety.

The present invention generally relates to a crosslinked polymeric material that has a high oxygen permeability and a high refractive index and is useful for making soft or rigid inserts for embedded contact lenses. In addition, the present invention provides a method for producing inserts made of a crosslinked polymeric material of the invention.

BACKGROUND

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,490,936, 7,883,207, 8,154,804, 8,215,770, 8,348,424, 8,874,182, 9,176,332, 9,618,773, 10,203,521, and 10,209,534; and U.S. Pat. Appl. Pub. Nos. 20040141150, 20040212779, 2008/0208335, 2009/0091818, 20090244477, 2010/0072643, 2010/0076553, 20110157544, 2012/0120365, 2012/0140167, 2012/0234453, 2014/0276481, and 2015/0145155).

Inserts are typically made of a non-hydrogel material that cannot absorb water and is a non-water-swellable material and has a low oxygen permeability and a relatively-low refractive index. A high oxygen permeability of an insert is required to have minimal adverse effects upon corneal health. A high refractive index would be desirable for imparting a higher optical performance to embedded contact lenses. It would be desirable to have inserts made of a material having an high oxygen permeability and high refractive index.

SUMMARY OF THE INVENTION

In one aspects, the invention provides an insert for being embedded in a silicone hydrogel contact lens. The insert comprises a crosslinked polymeric material, which comprises: (1) repeating units of at least polysiloxane-containing polymerizable material, wherein said at least polysiloxane-containing polymerizable material comprises at least one polysiloxane vinylic monomer and/or at least one polysiloxane vinylic crosslinker; (2) repeating units of at least one aryl acrylic monomer; and (3) repeating units of at least one vinylic crosslinking agent, wherein the sum of the amounts of components (1) and (2) are at least about 70% by weight relative to the total weight of the crosslinked polymeric material, wherein the crosslinked polymeric material in dry state has a glass transition temperature of greater than about 30° C., wherein the crosslinked polymeric material has a water content of less than about 5% by weight, an oxygen permeability of at least about 60 barrers, and a refractive index of at least about 1.45.

The invention, in another aspect, provides a method for producing embedded silicone hydrogel contact lenses each of which comprises an insert of the invention.

The invention, in a further aspect, provides an embedded silicone hydrogel contact lens comprising an insert of the invention therein.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material. A "silicone hydrogel contact lens" refers to a contact lens comprising a silicone hydrogel bulk (core) material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" refers to a hydrogel that is theoretically free of silicon.

An "embedded silicone hydrogel contact lens" refers a silicone hydrogel contact lens comprising at least one insert which is made of a non-hydrogel material and embedded within the silicone hydrogel material as the major lens material of the contact lens.

An "insert" refers to any 3-dimensional article which is made of a non-hydrogel material and has a dimension of at least 5 microns but is smaller in dimension sufficient to be embedded in a silicone hydrogel contact lens. In accordance with the invention, a non-hydrogel material can be any material which can absorb less than 5% (preferably about 4% or less, more preferably about 3% or less, even more preferably about 2% or less) by weight of water when being fully hydrated.

In accordance with the invention, an insert of the invention has a thickness less than any thickness of an embedded silicone hydrogel contact lens in the region where the insert is embedded. An insert can be any object have any geometrical shape and can have any desired functions. Examples of preferred inserts include without limitation thin rigid disks for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C═C< group. Exemplary ethylenically unsaturated groups include without limitation (meth)acryloyl

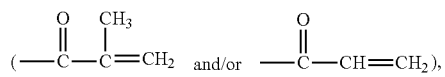

allyl, vinyl, styrenyl, or other C═C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

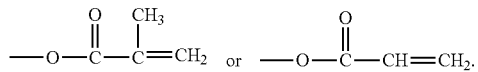

An "(meth)acrylamido monomer" refers to a vinylic monomer having one sole group of

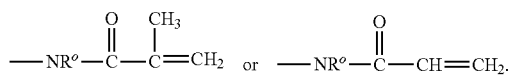

in which $R^o$ is H or $C_1$-$C_4$ alkyl.

The term "aryl acrylic monomer" refers to an acrylic monomer having at least one aromatic ring.

An "(meth)acryloxy monomer" or "(meth)acryloyloxy monomer" refers to a vinylic monomer having one sole group of

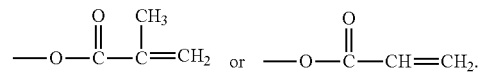

An "(meth)acrylamido monomer" refers to a vinylic monomer having one sole group of

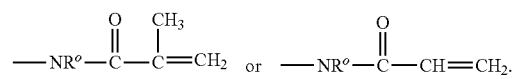

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═CH$_2$) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

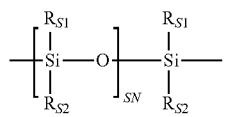

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma1}$—OR$^\circ$ (in which alk is $C_1$-$C_6$ alkylene diradical, R$^\circ$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The intrinsic "oxygen permeability", $Dk_i$, of a material is the rate at which oxygen will pass through a material. Oxygen permeability is conventionally expressed in units of barrers, where "barrer" is defined as [($cm^3$ oxygen)(mm)/($cm^2$)(sec)(mm Hg)]×$10^{-10}$. The oxygen permeability can be measured according to the procedures described in Example 1.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as [($cm^3$ oxygen)/($cm^2$)(sec)(mm Hg)]×$10^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert which is obtained by cast-molding of a polymerizable composition in a mold and has not been subjected to extraction and/or hydration post-molding processes (i.e., having not been in contact with water or any organic solvent or any liquid after molding).

In general, the invention is directed to crosslinked materials which are rigid in dry state at room temperature (from about 22° C. to about 26° C.), have a high oxygen permeability and a high refractive index in fully hydrated state, and can become softer at a temperature great than 32° C. Such materials are useful for making inserts in embedded contact lenses for correcting corneal astigmatism, presbyopia, and color blindness lenses and for imparting photochromic characteristics to the lenses.

The present invention is partly based on the finding that when a polymerizable composition for making inserts comprises (1) at least one aryl acrylic monomer and (2) at least one silicone-containing polymerizable material, as the two main components (i.e., in combination making up at least about 70% by weight relative to the total weight of all polymerizable materials) and at least one vinylic crosslinking agent, one can obtain insert materials that have a high oxygen permeability and a high refractive index and are rigid in dry state (unprocessed state) at room temperature. It is believed that by incorporating silicone-containing polymerizable components (e.g., vinylic monomer and/or crosslinker) in a polymerizable composition for making insert materials (crosslinked polymeric materials), resultant insert materials can have a high oxygen permeability. But, such insert materials are softer and sticky at room temperature so that there are manufacturing and handling problems associated with the softness and stickiness. It would be very difficult to open molds and remove cast-molded inserts from molds in unprocessed state (i.e., "dry-demolding and delensing"). It is found that by incorporating an aryl acrylic monomer and/or crosslinker in the polymerizable composition for making inserts, the results insert materials can have a higher glass transition temperature (e.g., greater than 32° C.) and thereby are rigid in dry state (i.e., unprocessed state) at room temperature. Because of their rigid forms in dry state at room temperature, the manufacturing and handling problems associated with the softness and stickiness of an insert material can be significantly reduced or eliminated.

The present invention is also partly based on the discovery that, by varying the ratio of the two types of polymerizable components as well as the amount of a vinylic crosslinker, one can obtain an insert material having a desired set of properties, such as, oxygen permeability, refractive index, and elastic modulus, suitable for embedded contact lenses for different applications. The performances of the embedded contact lenses can be optimized for a given application.

The present invention provides, in one aspect, an insert for being embedded in a silicone hydrogel contact lens, comprising a crosslinked polymeric material, which comprises: (1) repeating units of said at least one silicone-containing polymerizable material (or component); (2) repeating units of at least one aryl acrylic monomer; and (3) repeating units of at least one vinylic crosslinking agent, wherein the sum of the amounts of components (1) and (2) is at least about 70% by weight (preferably from about 75% to about 99% by weight, more preferably from about 80% to about 98% by weight, even more preferably from about 85% to 98% by weight) relative to the total weight of the crosslinked polymeric material, wherein the crosslinked polymeric material in dry state has a glass transition temperature of greater than about 28° C. (preferably about 30° C. or higher, more preferably about 32° C. or higher), wherein the crosslinked polymeric material has a water content of less than about 5% by weight (preferably about 4% by weight or less, more preferably about 3% by weight or less, even more preferably about 2% by weight or less), an oxygen permeability of at least about 60 barrers (preferably at least about 70 Barrers, more preferably at least about 80 Barrers, even more preferably at least about 90 Barrers), and a refractive index of at least about 1.45 (preferably at least about 1.47, more preferably at least about 1.49, even more preferably at least about 1.51).

It is understood that the weight percentages of each of the components of the crosslinked polymeric material of an insert of the invention can be obtained based on the weight percentages of its corresponding polymerizable component (material) in a polymerizable composition for making the insert.

In accordance with the invention, a silicone-containing polymerizable material (or component) can be a silicone-containing vinylic monomer, a polysiloxane vinylic crosslinker, or combinations thereof.

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, 3-methacryloxy silyl group, polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166, 236, 6,867,245, 8,415,405, 8,475,529, 8,614,261, and 9,217, 813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethyl-siloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), are described later in this application and can be prepared according to the procedures disclosed in U.S. patent Ser. No. 10/081,697.

Another class of preferred polysiloxane vinylic crosslinkers are vinylic crosslinkers each of which comprises one sole polydiorganosiloxane segment and two terminal (meth) acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

In accordance with the invention, an aryl vinylic monomer is a vinylic monomer of formula (I) or (II)

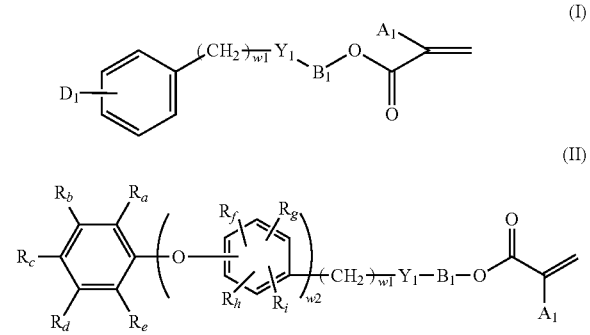

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≦8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

Examples of aryl acrylic monomers of formula (I) include, but are not limited to: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; or combinations thereof. The above listed aryl acrylic monomers of formula (I) can be obtained from commercial sources or alternatively prepared according to methods known in the art.

Preferred aryl acrylic monomers of formula (I) are those wherein $B_1$ is $OCH_2CH_2$, $(OCH_2CH_2)_2$, $(OCH_2CH_2)_3$, or $(CH_2)_{m1}$ in which m1 is 2-5, $Y_1$ is a direct bond or O, w1 is 0 or 1, and $D_1$ is H. Most preferred are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates.

Aryl acrylic monomers of formula (II) can be prepared from monofunctional polyphenyl ethers (i.e., ones with one functional group such as hydroxyl, amino, or carboxyl groups). Generally, a monofunctional OH-terminated poly (phenyl ether) is reacted with a (meth)acrylic acid derivative (such as acryloyl chloride, methacryloyl chloride, methacrylic anhydride, or an isocyanatoalkyl acrylate or methacrylate) under coupling reaction conditions known to a person skilled in the art. Mono-amine and mono-carboxylic acid terminated polyphenyl ethers are functionalized in a similar manner using suitable (meth)acrylic acid derivatives. Monofunctional terminated polyphenyl ethers can be prepared according to procedures described in literature (*J. Org. Chem.*, 1960, 25 (9), pp 1590-1595). The experiment procedures for preparing aryl acrylic monomers of formula (II) can be found in U.S. patent Ser. No. 10/064,977.

Any suitable vinyl crosslinking agents can be used in the invention. Examples of preferred vinylic cross-linking agents include without limitation: ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; allyl methacrylate; allyl acrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide, pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, an aryl crosslinking agent (e.g., divinylbenzene, 2-methyl-1,4-divinylbenzene, bis(4-vinylphenyl)methane, 1,2-bs(4-vinylphenyl)ethane, etc.), or combinations thereof.

In accordance with the invention, the amount of the vinylic crosslinking agent is from about 1% to about 30% by weight, preferably from about 1% to about 25% by weight, more preferably from about 2% to about 20% by weight, even more preferably from about 2% to about 15% by weight.

Insert materials of this invention are prepared by conventional polymerization methods. For example, a polymerizable composition can be prepared by mixing all polymerizable materials as described above in the desired proportions, together with any other polymerizable materials, such as a UV-absorbing vinylic monomer, a UV/high-energy-violet-light ("HEVL") absorbing vinylic monomer, polymerizable photochromic compound, and a conventional thermal initiator (or a photoiniator), in the presence or preferably in the absence of a non-reactive organic solvent (i.e., a non-reactive diluent). The polymerizable composition can then be introduced into a mold of desired shape, and the polymerization carried out thermally (i.e., by heating) or photochemically (i.e., by actinic radiation, e.g., UV radiation and/or visible radiation) to activate the initiator.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylp-eroxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc, 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'- acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3''-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

Once the insert materials of the present invention have been cured, they are extracted in a suitable solvent to remove as much of the unreacted components of the materials as possible. Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

An insert material of the invention can be found particular use in making embedded silicone hydrogel contact lenses.

The invention also provides a method for producing embedded silicone hydrogel contact lenses, the method of invention comprising the steps of: (1) obtaining a silicone-hydrogel-lens-forming composition (i.e., a silicone hydrogel lens formulation or a polymerizable composition for forming silicone hydrogel contact lenses); (2) obtaining an insert, wherein the insert is made of a crosslinked polymeric material of the invention as described above, wherein the disk is made of a rigid gas permeable material; (3) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (4) in no particular order, placing the insert of the invention as described above at a specified position in the lens mold and introducing the silicone-hydrogel-lens-forming composition in the lens mold, wherein the insert is immersed in the silicone-hydrogel-lens-forming composition in the lens mold; (5) curing the silicone-hydrogel-lens-forming composition in the lens mold to form an unprocessed embedded silicone hydrogel contact lens; (6) separating the lens mold obtained in step (5) into the male and female mold halves, with the unprocessed embedded silicone hydrogel contact lens adhered on a lens-adhered mold half which is one of the male and female mold halves; (7) removing the unprocessed embedded silicone hydrogel contact lens from the lens-adhered mold half before the unprocessed embedded silicone hydrogel contact lens is contact with water or any liquid; and (8) subjecting the unprocessed embedded silicone hydrogel contact lens to post-molding processes including a hydration process and one or more other processes selected from the group consisting of extraction, surface treatment, packaging, sterilization, and combinations thereof.

In accordance with the invention, a silicone-hydrogel-lens-forming composition comprises at least one silicone-containing polymerizable material (or component) and at least one hydrophilic vinylic monomer.

Any silicone-containing polymerizable materials (or components) described above can be used in forming a silicone-hydrogel-lens-forming composition.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

A silicone-hydrogel-lens-forming composition can also further comprise at least one hydrophobic vinylic monomer, at least one non-silicone vinylic crosslinker, or combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth) acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

A silicone-hydrogel-lens-forming composition can also comprise other necessary components known to a person skilled in the art, such as, for example, for example, free-radical initiators (e.g., thermal polymerization initiators, photoinitiators) (as described above in this application), a UV-absorbing vinylic monomer (as described above in this application), a UV/HEVL-absorbing vinylic monomer (as described above in this application), a visibility tinting agent (e.g., reactive dyes, polymerizable dyes, pigments) (as described above in this application), antimicrobial agents (e.g., preferably silver nanoparticles), a bioactive agent, leachable polymeric wetting agents (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A silicone-hydrogel-lens-forming composition (SiHy lens formulation) can be a solventless clear liquid prepared by mixing all polymerizable components (or materials) and other necessary component (or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described above in this application).

A solventless lens SiHy lens formulation (silicone-hydrogel-lens-forming composition) typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Numerous SiHy lens formulations (silicone-hydrogel-lens-forming composition) have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A silicone-hydrogel-lens-forming compositioncomposition (SiHy lens formulation) can be prepared by dissolving/blending all of the desirable components (materials) and optionally one or more organic solvents (described above), according to any known techniques.

In accordance with the invention, the silicone-hydrogel-lens-forming composition is suitable for forming a silicone hydrogel material that can have a water content of from about 20% to about 70% (preferably from about 20% to about 65%, more preferably from about 25% to about 65%, even more preferably from about 30% to about 60%) by weight when being fully hydrated. The polymerizable composition can comprises: (a) from about 20% to about 79% (preferably from about 20% to about 75%, more preferably from about 25% to about 70%, even more preferably from about 30% to about 65%) by weight of at least one silicone-containing vinylic monomer and/or at least one silicone-containing vinylic crosslinker; (b) 20% to about 79% (preferably from about 20% to about 75%, more preferably from about 25% to about 70%, even more preferably from about 30% to about 65%) by weight of the hydrophilic vinylic monomer; (c) from 0 to about 2.5% (preferably from 0 to about 2.0%, more preferably from 0 to about 1.5%, even more preferably from about 0 to about 1.0%) by weight of the non-silicone vinylic crosslinker; (d) from about 0.05% to about 2.0% (preferably from about 0.1% to about 2.0%, more preferably from about 0.2% to about 1.5%, even more preferably from about 0.3% to about 1.2%) by weight of the free-radical initiator; (e) from 0 to about 15% (preferably from 0 to about 14%, more preferably from about 2% to about 13%, even more preferably from about 4% to about 12%) by weight of the blending vinylic monomer; and (f) from 0 to about 3.0%, preferably about 0.1% to about 2.5%, more preferably about 0.2% to about 2.0%, by weight of the UV-absorbing vinylic monomer and/or the UV/HEVL-absorbing vinylic monomer, relative to the total amount of the polymerizable composition, provided that the sum of the amounts of polymerizable materials (a) to (f) and other not-listed components is 100%. Preferably, the sum of the amounts of polymerizable materials (a) and (b) is at least 70% (preferably at least 75%, more preferably at least 80, even more preferably at least 85%) by weight relative to the total amount of all polymerizable materials in the polymerizable composition.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the insert can be placed in the mold and the silicone-hydrogel-lens-forming composition can be introduced (dispensed) into a cavity formed by a mold according to any known techniques known to a person skilled in the art. In a preferred embodiment, an insert is placed on the molding surface of a female mold half at a specified position; and then a specific amount of a silicone-hydrogel-lens-forming composition is dispensed into the female mold half with the insert thereon by means of a dispensing device and then a male mold half is put on and the mold is closed. As the mold closes, any excess unpolymerized lens-forming material is pressed into an overflow provided on the female mold half (or alternatively on the male mold half), and the insert is immersed in the silicone-hydrogel-lens-forming composition in the mold.

After the insert of the invention is placed in the mold and the silicone-hydrogel-lens-forming composition is dispensed into the mold, the closed mold containing the silicone-hydrogel-lens-forming composition subsequently is cured (i.e., polymerized) thermally or actinically (but preferably is initiated thermally) to form an unprocessed embedded silicone hydrogel contact lens.

The actinic polymerization of the silicone-hydrogel-lens-forming composition in the mold can be carried out by irradiating the closed mold with the silicone-hydrogel-lens-forming composition therein with an UV or visible light, according to any techniques known to a person skilled in the art.

The thermal polymerization of the silicone-hydrogel-lens-forming composition in the mold can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

In a preferred embodiment, after the silicone-hydrogel-lens-forming composition in the molds in the oven is cured to form unprocessed embedded silicone hydrogel contact lenses, the temperature of the oven is increased to a post-curing temperature of about 105° C. or higher (preferably at least about 110° C., more preferably at least about 115° C., even more preferably at least about 120° C.), and the flow rate of nitrogen gas through the oven is increased to a second flow rate which is at least about 1.5 folds (preferably at least about 2.0 folds, more preferably at least about 3.0 folds, even more preferably at least about 4.0 folds) of the first flow rate.

The post-curing treatment step is carried out by heating the lens mold with the unprocessed embedded silicone hydrogel contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

After the curing step and optionally the post-curing step, the steps of opening a mold (i.e., separating the male mold half from the female mold half with the unprocessed embedded silicone hydrogel contact lens attached onto one of the male and female mold halves) and delensing (i.e., removing the unprocessed embedded silicone hydrogel contact lens from the lens-adhered mold half) are carried out.

After the unprocessed embedded silicone hydrogel contact lens is delensed, it typically is extracted with an extraction medium as well known to a person skilled in the art. The extraction liquid medium is any solvent capable of dissolving the diluent(s), unpolymerized polymerizable materials, and oligomers in the unprocessed embedded silicone hydrogel contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded silicone hydrogel contact lens can then be hydrated according to any method known to a person skilled in the art.

The hydrated embedded silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In a further aspect, the invention provides an embedded silicone hydrogel contact lens, which comprises a silicone hydrogel material and an insert of the invention (as described above in this application) therein, wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer, wherein the embedded silicone hydrogel contact lens in fully hydrated state has a water content of from about 15% to about 70% (preferably from about 15% to about 65%, more preferably from about 20% to about 65%, even more preferably from about 25% to about 60%) by weight of water when being fully hydrated.

All the various embodiments including preferred embodiments of the polymerizable compositions, the silicone-containing vinylic monomers, the silicone-containing vinylci crosslinkers, the hydrophilic vinylic monomers, the non-silicone vinylic crosslinkers, the hydrophobic vinylic monomers, the UV/HEVL-absorbing vinylic monomers, the blending vinylic monomers, the inserts, the RGP disks, the polymeric non-reactive diluents, the water-swelling degrees of unprocessed embedded silicone hydrogel contact lenses, and the equilibrium water contents of the embedded silicone hydrogel contact lenses can be incorporated in these two aspects of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. An insert for being embedded in a silicone hydrogel contact lens, comprising a crosslinked polymeric material, which comprises:
   (1) repeating units of said at least one silicone-containing polymerizable material;
   (2) repeating units of at least one aryl acrylic monomer; and
   (3) repeating units of at least one vinylic crosslinking agent,
   wherein the sum of the amounts of components (1) and (2) of the crosslinked polymeric material is at least about 70% by weight relative to the total weight of the crosslinked polymeric material, wherein the crosslinked polymeric material in dry state has a glass transition temperature of greater than about 28° C., wherein the crosslinked polymeric material in fully hydrated state has a water content of less than about 5% by weight, an oxygen permeability of at least about 60 barrers, and a refractive index of at least about 1.45.
2. The insert of embodiment 1, wherein the sum of the amounts of components (1) and (2) of the crosslinked polymeric material is from about 75% to about 99% by weight, relative to the total weight of the crosslinked polymeric material.
3. The insert of embodiment 1, wherein the sum of the amounts of components (1) and (2) of the crosslinked polymeric material is from about 80% to about 98% by weight, relative to the total weight of the crosslinked polymeric material.
4. The insert of embodiment 1, wherein the sum of the amounts of components (1) and (2) of the crosslinked polymeric material is from about 85% to about 98% by weight, relative to the total weight of the crosslinked polymeric material.
5. The insert of any one of embodiments 1 to 4, wherein the amount of component (2) of the crosslinked polymeric material is from about 25% to about 50% by weight, relative to the total weight of the crosslinked polymeric material.
6. The insert of any one of embodiments 1 to 5, wherein the crosslinked polymeric material in dry state has a glass transition temperature of about 30° C. or higher.
7. The insert of any one of embodiments 1 to 5, wherein the crosslinked polymeric material in dry state has a glass transition temperature of about 32° C. or higher.
8. The insert of any one of embodiments 1 to 7, wherein the crosslinked polymeric material in fully hydrated state has a water content of about 4% by weight or less.
9. The insert of any one of embodiments 1 to 7, wherein the crosslinked polymeric material in fully hydrated state has a water content of about 3% by weight or less.
10. The insert of any one of embodiments 1 to 7, wherein the crosslinked polymeric material in fully hydrated state has a water content of about 2% by weight or less.
11. The insert of any one of embodiments 1 to 10, wherein the crosslinked polymeric material in fully hydrated state has an oxygen permeability of at least about 70 Barrers.
12. The insert of any one of embodiments 1 to 10, wherein the crosslinked polymeric material in fully hydrated state has an oxygen permeability of at least about 80 Barrers.
13. The insert of any one of embodiments 1 to 10, wherein the crosslinked polymeric material in fully hydrated state has an oxygen permeability of at least about 90 Barrers.
14. The insert of any one of embodiments 1 to 13, wherein the crosslinked polymeric material in fully hydrated state has a refractive index of at least about 1.47.
15. The insert of any one of embodiments 1 to 13, wherein the crosslinked polymeric material in fully hydrated state has a refractive index of at least about 1.49.
16. The insert of any one of embodiments 1 to 13, wherein the crosslinked polymeric material in fully hydrated state has a refractive index of at least about 1.51.
17. The insert of any one of embodiments 1 to 16, wherein said at least one aryl acrylic monomer is a vinylic monomer of formula (I) or (II)

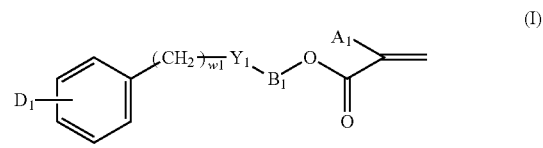

-continued

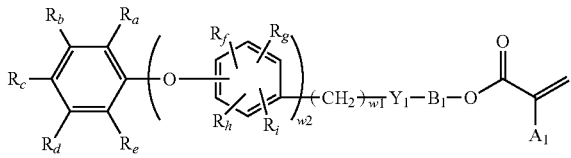

(II)

wherein $A_1$ is H or $CH_3$ (preferably H); $B_1$ is $(CH_2)_{m1}$ or $[O(CH_2)_2]z_1$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≦8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

18. The insert of any one of embodiments 1 to 16, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl) ethyl acrylate; 2-(4-methylphenyl)ethyl methacrylate; 2-(4-propylphenyl)ethyl acrylate; 2-(4-propylphenyl) ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl) ethyl acrylate; 2-(3-chlorophenyl)ethyl methacrylate; 2-(4-chlorophenyl)ethyl acrylate; 2-(4-chlorophenyl) ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy] ethyl acrylate; 2-[2-(benzyloxy)ethoxy]ethyl methacrylate, and combinations thereof.

19. The insert of any one of embodiments 1 to 16, wherein said at least one aryl acrylic monomer comprises 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; 2-phenylethyl methacrylate; 3-phenylpropyl methacrylate; 4-phenylbutyl methacrylate; 5-phenylpentyl methacrylate; 2-benzyloxyethyl methacrylate; 3-benzyloxypropyl methacrylate; 2-[2-(benzyloxy)ethoxy]ethyl methacrylate, or combinations thereof.

20. The insert of any one of embodiments 1 to 19, wherein said at least one vinylic crosslinking agent comprises ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; allyl methacrylate; allyl acrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide, pentaerythritol triacrylate, pentaerythritol trimethacrylate, trimethyloylpropane triacrylate, trimethyloylpropane trimethacrylate, tris(2-hydroxyethyl) isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, an aryl crosslinking agent (e.g., divinylbenzene, 2-methyl-1,4-divinylbenzene, bis(4-vinylphenyl)methane, 1,2-bs(4-vinylphenyl)ethane, etc.), or combinations thereof.

21. The insert of any one of embodiments 1 to 20, wherein the amount of said at least one vinylic crosslinking agent is from about 1% to about 30% by weight.

22. The insert of any one of embodiments 1 to 20, wherein the amount of said at least one vinylic crosslinking agent is from about 1% to about 25% by weight.

23. The insert of any one of embodiments 1 to 20, wherein the amount of said at least one vinylic crosslinking agent is from about 2% to about 20% by weight.

24. The insert of any one of embodiments 1 to 20, wherein the amount of said at least one vinylic crosslinking agent is from about 2% to about 15% by weight.

25. The insert of any one of embodiments 1 to 24, wherein said at least one silicone-containing polymerizable material comprises a vinylic monomer having a bis (trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, or combinations thereof.

26. The insert of any one of embodiments 1 to 24, wherein said at least one silicone-containing polymerizable material comprises a vinylic monomer of formula (M1) or (M2)

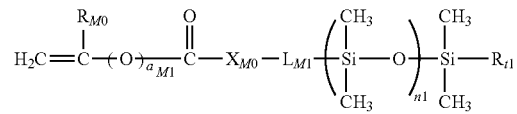

(M1)

-continued

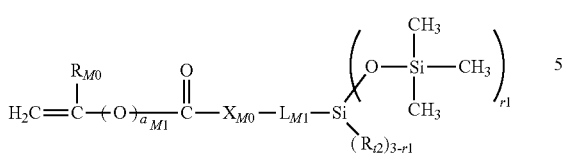
(M2)

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

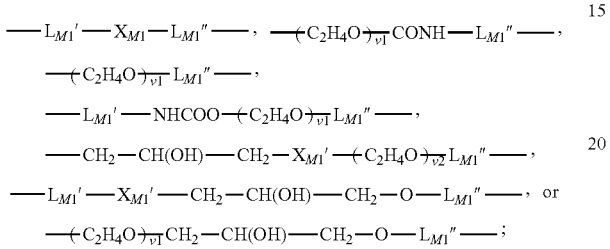

$L_{M1'}$ is a $C_2$-$C_8$ alkylene divalent radical which has zero or one hydroxyl group; $L_{M1''}$ is a $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1'}$ is O or $NR_1$; v1 is an integer of 1 to 30; m2 is an integer of 0 to 30; n1 is an integer of 3 to 40; and r1 is an integer of 2 or 3.

27. The insert of any one of embodiments 1 to 24, wherein said at least one silicone-containing polymerizable material comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl](meth)acrylamide, N-[tris(dimethylethylsiloxy)-silylpropyl](meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl](meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl](meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl](meth)acrylamide, N,N-bis[2-hydroxy-3-(3-(t-butyldimethylsilyl)propyloxy)pro-pyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, or a combination thereof.

28. The insert of any one of embodiments 1 to 24, wherein said at least one silicone-containing polymerizable material comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)

dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

29. The insert of any one of embodiments 1 to 28, wherein said at least one silicone-containing polymerizable material comprises at least one first polysiloxane vinylic crosslinker.

30. The insert of embodiment 29, wherein said at least one first polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

31. The insert of embodiment 29 or 30, wherein said at least one first polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy) propyl]-terminated polydimethylsiloxane, or combinations thereof.

32. The insert of any one of embodiments 1 to 31, wherein the insert has a modulus of great than 20 MPa at room temperature.

33. The insert of any one of embodiments 1 to 31, wherein the insert has a modulus of great than 30 MPa at room temperature.

34. The insert of any one of embodiments 1 to 31, wherein the insert has a modulus of great than 40 MPa at room temperature.

35. The insert of any one of embodiments 1 to 31, wherein the insert has a modulus of great than 50 MPa at room temperature.

36. A method for producing embedded silicone hydrogel contact lenses, comprising the steps of:
    (1) obtaining a silicone-hydrogel-lens-forming composition;
    (2) obtaining an insert of any one of embodiments 1 to 35;
    (3) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
    (4) in no particular order, placing the insert of the invention as described above at a specified position in the lens mold and introducing the silicone-hydrogel-lens-forming composition in the lens mold, wherein the insert is immersed in the silicone-hydrogel-lens-forming composition in the lens mold;
    (5) curing the silicone-hydrogel-lens-forming composition in the lens mold to form an unprocessed embedded silicone hydrogel contact lens that comprises a silicone hydrogel material and the insert embedded within the silicone hydrogel material;
    (6) separating the lens mold obtained in step (5) into the male and female mold halves, with the unprocessed embedded silicone hydrogel contact lens adhered on a lens-adhered mold half which is one of the male and female mold halves;
    (7) removing the unprocessed embedded silicone hydrogel contact lens from the lens-adhered mold half before the unprocessed embedded silicone hydrogel contact lens is contact with water or any liquid; and
    (8) subjecting the unprocessed embedded silicone hydrogel contact lens to post-molding processes including a hydration process and one or more other processes selected from the group consisting of extraction, surface treatment, packaging, sterilization, and combinations thereof.

37. An embedded silicone hydrogel contact lenses, comprising: a silicone hydrogel material; and an insert of any one of embodiments 1 to 35 within the silicone hydrogel material, wherein the silicone hydrogel material is a crosslinked material that has a polymer matrix and comprises (a) repeating units of at least one second silicone-containing vinylic monomer and/or at least one second silicone-containing vinylic crosslinker and (b) repeating units of at least one hydrophilic vinylic monomer, wherein the embedded silicone hydrogel contact lens in fully hydrated state has a water content of from about 15% to about 70% by weight of water when being fully hydrated.

38. The method of embodiment 36 or the embedded silicone hydrogel contact lens of embodiment 37, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

39. The method of embodiment 36 or 38 or the embedded silicone hydrogel contact lens of embodiment 37 or 38, wherein the silicone hydrogel material comprises repeating units of at least one second silicone-containing vinylic monomer of formula (M1) or (M2)

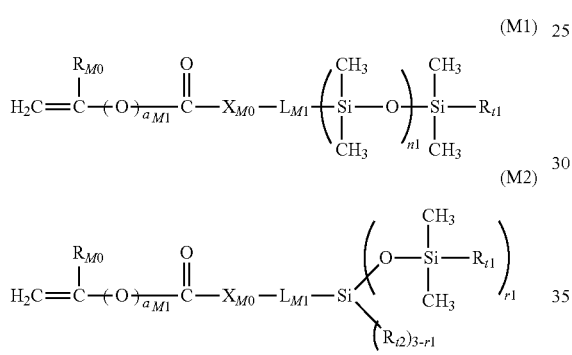

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of —$L_{M1'}$—$X_{M1}$—$L_{M1''}$—, —$(C_2H_4O)_{\overline{v1}}$CONH—$L_{M1''}$—, —$(C_2H_4O)_{\overline{v1}}L_{M1''}$—, —$L_{M1'}$—NHCOO—$(C_2H_4O)_{\overline{v1}}L_{M1''}$—, —$CH_2$—$CH(OH)$—$CH_2$—$X_{M1'}$—$(C_2H_4O)_{\overline{v2}}L_{M1''}$—, —$L_{M1'}$—$X_{M1'}$—$CH_2$—$CH(OH)$—$CH_2$—O—$L_{M1''}$—, or —$(C_2H_4O)_{\overline{v1}}CH_2$—$CH(OH)$—$CH_2$—O—$L_{M1''}$—;

$L_{M1'}$ is a $C_2$-$C_8$ alkylene divalent radical which has zero or one hydroxyl group; $L_{M1''}$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_4$ alkyl; $X_{M1'}$ is O or $NR_1$; v1 is an integer of 1 to 30; m2 is an integer of 0 to 30; n1 is an integer of 3 to 40; and r1 is an integer of 2 or 3.

40. The method of any one of embodiments 36, 38 and 39 or the embedded silicone hydrogel contact lens of any one of embodiments 37-39, wherein the silicone hydrogel material comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl](meth)acrylamide, N-[tris(dimethylethylsiloxy)-silylpropyl](meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl](meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl](meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl](meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, or a combination thereof.

41. The method of any one of embodiments 36 and 38-40 or the embedded silicone hydrogel contact lens of any one of embodiments 37-40, wherein the silicone hydrogel material comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

42. The method of any one of embodiments 36 and 38-41 or the embedded silicone hydrogel contact lens of any one of embodiments 37-41, wherein the silicone hydrogel material comprises repeating units of at least one second polysiloxane vinylic crosslinker.

43. The method or the embedded silicone hydrogel contact lens of embodiment 42, wherein said at least one second polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

44. The method or the embedded silicone hydrogel contact lens of embodiment 42, wherein said at least one second polysiloxane vinylic crosslinker comprises a vinylic crosslinker of formula (III)

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{01}$ is O or $NR_{IN}$ in which $R_{IN}$ is hydrogen or $C_1$-$C_{10}$-alkyl;

$R_{I0}$ is hydrogen or methyl; $R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (IIIa) to (IIIe)

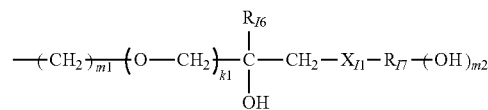

(IIIa)

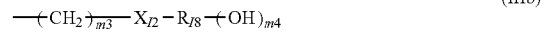

(IIIb)

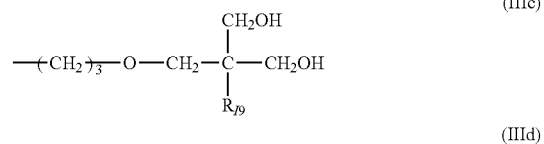

(IIIc)

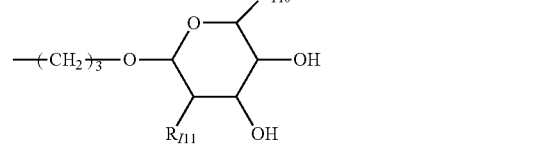

(IIId)

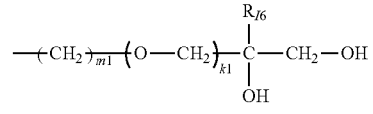

(IIIe)

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and

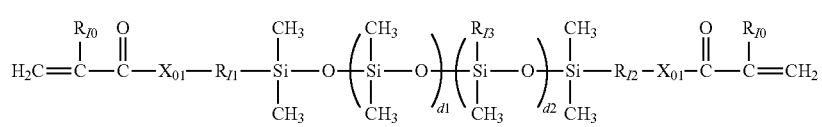

(III)

$X_{I2}$ is an amide linkage of

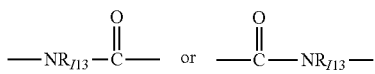

in which $R_{I13}$ is hydrogen or $C_1$-$C_{10}$ alkyl.

45. The method or the embedded silicone hydrogel contact lens of any one of embodiments 42 to 44, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

46. The method or the embedded silicone hydrogel contact lens of any one of embodiments 42 to 45, wherein said at least one second polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

47. The method of any one of embodiments 36 and 38-46 or the embedded silicone hydrogel contact lens of any one of embodiments 37-46, wherein the silicone hydrogel material comprises repeating units of at least one hydrophilic vinylic monomer.

48. The method or the embedded silicone hydrogel contact lens of embodiment 47, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3, 3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio) ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio) ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-p-alanine (VINAL); (14) N-carboxyvinyl-α-alanine; (15) or combinations thereof.

49. The method or the embedded silicone hydrogel contact lens of embodiment 47 or 48, wherein said at least one hydrophilic vinylic monomer comprises N-vinylpyrrolidone, N-vinyl-N-methyl acetamide, or combinations thereof.

50. The method or the embedded silicone hydrogel contact lens of any one of embodiments 47 to 49, wherein said at least one hydrophilic vinylic monomer comprises N,N-dimethyl (meth)acrylamide.

51. The method or the embedded silicone hydrogel contact lens of any one of embodiments 47 to 50, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

52. The method of any one of embodiments 36 and 38-51 or the embedded silicone hydrogel contact lens of any one of embodiments 37-51, wherein the silicone hydrogel material comprises repeating units of at least one non-silicone vinylic cross-linking agent.

53. The method or the embedded silicone hydrogel contact lens of embodiment 52, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)]di-(meth)acrylate, bis[2-(meth)acryloxyethyl]phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

54. The method of any one of embodiments 36 and 38-53 or the embedded silicone hydrogel contact lens of any one of embodiments 37-53, wherein the silicone hydrogel material comprises repeating units of at least one blending vinylic monomer.

55. The method or the embedded silicone hydrogel contact lens of embodiment 54, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature.

Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Refractive Index

The refractive index (RI) of inserts is determined by Abbe transmission laboratory refractometer Reichert Abbe Mark III at 25° C. The inserts are fully equilibrated in PBS saline solution before measurement.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10-50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Glass Transition Temperature

Glass transition temperature (Tg) of the insert is defined as the peak of tan δ from the dynamic temperature ramp test as described above.

Delamination

Embedded silicone hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (OPTIMEC England, model JCF). After the contact lens is settled under the influence of gravity, the front view of the contact lens is inspected carefully for any sign of circular pattern. Delamination displays as circular patterns in Optimec image.

OCT (Thorlabs Spectral Domain Optical Coherence Tomography, model Telesto-II) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: PEMA represents phenylethyl methacrylate; PEA represent phenylethyl acrylate; BzA represents benzylacrylate; BzMA represent benzylmathacrylate; PVV represents vinylphenylmethyl terminated phenylmethylsiloxane-vinylphenylsiloxane copolymer (PVV-3522, 800-1500 Daltons, from Gelest); PMV represents vinyl terminated polyphenylmethylsiloxane (PMV-9925, 2000-3000 Daltons from Gelest); TBEC represents tert-Butylperoxy 2-ethylhexyl carbonate; PETA represents pentaerythritol tetraacrylate; TrisMA represents 3-[Tris(trimethylsiloxy)silyl]propyl methacrylate; HFIPMA represents hexafluoroisopropyl methacrylate; NPGDMA represents neopentylglycol dimethacrylate; TrisAm represents N-[tris(trimethylsiloxy)-silylpropyl]acrylamide; D6 represents monobutyl-terminated monomethacryloxypropyl-terminated polydimethylsiloxane (M.W. 600 to 800 g/mol from Gelest); D9 represents monobutyl-terminated monomethacryloxypropyl-terminated polydimethylsiloxane (Mw~984 g/mol from Shin-Etsu); Betacon represents a dimethacrylate-terminated chain-extended polydimethylsiloxane (Mn 5000 g/mol), which has two polydimethylsiloxane (PDMS) segments separated by one perfluoropolyether (PFPE) via diurethane linkages between PDMS and PFPE segments and two urethane linkages each located between one terminal methacrylate group and one PDMS segment, is prepared according to method similar to what described in Example B-1 of U.S. Pat. No. 5,760,100; BDDA represents 1,4-butanediol diacrylate; NVP represents N-vinylpyrrolidone; DMA represents N,N-dimethyl acrylamide; MMA represents methyl methacrylate; TEGDMA represent triethyleneglycol dimethacrylate; EGDMA represents ethylene glycol methyl ether methacrylate; AMA represents allyl methacrylate; AIBN represents 2,2'-azobis(isobutyronitrile); Vazo-64 represents 2,2'-dimethyl-2,2'azodipropiononitrile; V88 represents 1,1'-Azobis(cyanocyclohexane) which has a 10-hour half-life temperature of 88° C.; Nobloc is 2-[3-(2H-Benzotriazol-2-yl)-4-hydroxyphenyl]ethyl methacrylate from Aldrich; RB247 is Reactive Blue 247; TAA represents tert-amyl alcohol; PrOH represents 1-propanol; IPA represents isopropanol; PPG represents poly(propylene glycol); EGBE represents ethylene glycol butyl ether; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; "H4" macromer represents a di-methacryloyloxypropyl-terminated polysiloxane (Mn~11.3K-12.3K g/mol, OH content ~1.82-2.01 meq/g) of formula (A) shown below; "H$_1$" macromer represents a di-methacryloyloxypropyl-terminated polysiloxane (Mn ~8,000 g/mol, OH content ~1.8-2.0 meq/g) of formula (A) shown below.

Example 2

Polymerizable Composition

Polymerizable compositions for making inserts are prepared by as control lens formulation is prepared at room temperature in air by blending all the components (materials) in their desired amounts (weight parts units) to have the composition shown in Tables 1-3.

TABLE 1

| | Polymerizable Composition # | | |
|---|---|---|---|
| | A | B | C |
| PEMA | 57.5 | 57.5 | 57.5 |
| D6 | 40 | 40 | 40 |
| BDDA | 3 | 5 | 10 |
| AIBN | 1 | 1 | 1 |
| TOTALS | 101.5 | 103.5 | 108.5 |
| Delensing | Dry delensable after 2s cold air treat | Dry delensable after 2s cold air treat | Dry delensable at RT |
| RI | 1.53 | 1.52 | 1.50 |
| DK | 113 | 107 | 108 |
| Modulus (MPa) | 2.4 | 5.8 | 22 |

TABLE 2

| | Polymerizable Composition # | | | | |
|---|---|---|---|---|---|
| | D | E | F | G | H |
| PEMA | 57.5 | 57.5 | 57.5 | 57.5 | 57.5 |
| Si-containing Component | Tris-MA | D6 | 40 D9 | R11 | Betacon |
| BDDA | 3 | 3 | 3 | — | — |
| AIBN | 1 | 1 | 1 | 1 | 1 |
| RI | 1.50 | 1.50 | 1.50 | 1.50 | 1.50 |
| DK | 93 | 113 | 110 | 96 | 108 |
| Modulus (MPa) | 28 | 2.4 | 2.6 | 20.3 | 10 |

TABLE 3

| | Polymerizable Composition # | | | |
|---|---|---|---|---|
| Formulation # | E | F | G | H |
| Aryl Acrylic monomer | PEA | 57.5 PEMA | BzA | BzMA |
| D6 | 40 | 40 | 40 | D6 |

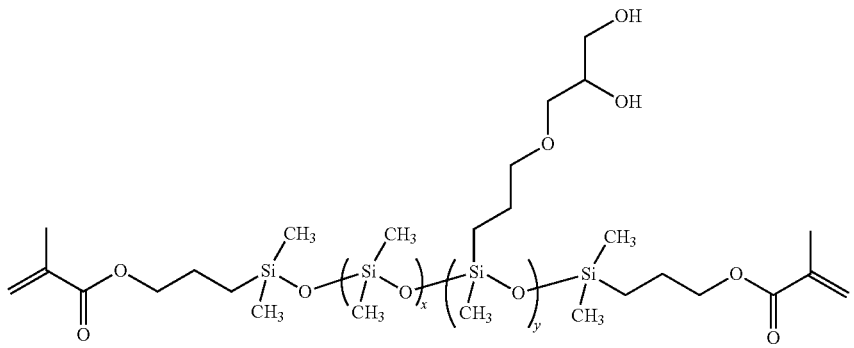

(A)

TABLE 3-continued

| Formulation # | Polymerizable Composition # | | | |
|---|---|---|---|---|
| | E | F | G | H |
| BDDA | 3 | 3 | 3 | 3 |
| AIBN | 1 | 1 | 1 | 1 |
| RI | 1.50 | 1.53 | 1.50 | 1.54 |
| Modulus (MPa) | 0.6 | 2.4 | 1.8 | 30 |

Cast-Molded Inserts

A polymerizable composition is purged with nitrogen at room temperature for 30 to 35 minutes. The $N_2$-purged polymerizable composition is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded inserts are removed from the molds.

The inserts are then extracted and hydrated as follows. First, the inserts are extracted with PrOH for about 3 hours, rinsed twice with deionized water for about 10 minutes, and then soaked in PBS for at least our hour before testing.

The results of tests and dry-delensability observations are reported in Tables 1-3.

The modulus of inserts are also tested at various temperature. The results are reported in Table 4.

TABLE 4

| Temperature Ramp | Storage Modulus of Inserts [MPa] | | |
|---|---|---|---|
| Temperature [° C.] | A | B | C |
| 15 | 124.0 | 42.3 | 186.0 |
| 20 | 65.3 | 36.8 | 85.1 |
| 25 | 31.8 | 22.5 | 50.0 |
| 30 | 11.3 | 10.7 | 45.8 |
| 35 | 4.7 | 5.3 | 22.3 |
| 37 | 2.7 | 4.2 | 16.6 |
| Thickness (μm) | 87 | 110 | 97 |
| $T_g$ (@ peak of tan δ)(° C.) | 31.6 | 21.0/35.2 | 28.7/41.9 |

Example 3

Preparation of Inserts

Polymerizable compositions (i.e., Insert formulation) for making rigid or soft hydrophobic inserts are prepared at room temperature in air by blending all the components (materials) in their desired amounts (weight parts units) to have the composition shown as followings Insert Formulation 1 (rigid): 62 weight part units of PEMA; 27 weight part units of D6; 10 weight part units of BDDA; 1 weight part unit of VAZO-64.

Insert Formulation 2 (semi rigid): 89 weight part units of BzA; 10 weight parts units of BDDA; 1 weight part unit of VAZO-64.

Insert Formulation 3 (soft): 29 weight part units of Betacon; 17 weight part units of Tris-MA; 28 weight part units of DMA; 25 weight part units of EGBE; and 0.5 weight part unit of VAZO-64.

A polymerizable composition prepared above is purged with nitrogen at room temperature for 30 to 35 minutes. The $N_2$-purged polymerizable composition is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The molds are opened and the molded inserts are removed from the molds.

Optionally, the inserts can be extracted and hydrated as follows. First, the inserts are extracted with PrOH for about 3 hours, rinsed twice with deionized water for about 10 minutes, and then soaked in PBS for at least our hour before testing. It is found that extraction of inserts are not needed.

The properties of inserts are reported in Table 5.

TABLE 5

| | Insert 1 | Insert 2 | Insert 3 |
|---|---|---|---|
| Modulus (MPa) | 22 | 8 | 0.9 |
| RI | 1.53 | 1.55 | 1.41 |

Preparation of Embedded SiHy contact lenses

Four SiHy lens formulations are prepared at room temperature in air by blending all the components (materials) in their desired amounts (weight parts units) to have the composition shown below:

SiHy Lens Formulation 1: 40 weight part units of CE-PDMS (Mn~10.5K Daltons); 28 weight part units of TrisAm; 32 weight part units of DMA; 5 weight part units of PrOH; 0.5 weight part unit of VAZO-64.

SiHy Lens Formulation 2: 55 weight part units of H1; 24 weight part units of DMA; 25 weight part units of EGBE; 1 weight part unit of VAZO-64.

SiHy Lens Formulation 3: 57 weight part units of H1; 22 weight part units of DMA; 30 weight part units of EGBE; 1 weight part unit of VAZO-64.

SiHy Lens Formulation 4: 40 weight part units of H1; 15 weight part units of MMA; 20 weight part units of DMA, 28 weight part units of EGBE; 1 weight part unit of VAZO-64.

Cast-molded contact lenses are prepared as follows. An insert prepared above is placed in the central region of the molding surface of a female mold half (made of polypropylene) which preferably has three or more spikes distributed in a circle having a diameter sufficient to accommodate the insert for fixing the position of the insert on the molding surface, an amount of a SiHy lens formulation prepared above is dosed in the female mold half to immerse the insert, a polypropylene male mold half is then placed on top the female mold half, and the mold is closed securely.

The closed mold with an insert immersed in a SiHy lens formulation therein are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The molds are opened and the molded inserts are removed from the molds.

Lens molds each with a molded unprocessed silicone hydrogel contact lens therein are mechanically opened. The molded unprocessed embedded silicone hydrogel contact lens adhere to the male mold halves or female mold halves. Molded unprocessed embedded silicone hydrogel contact lenses adhered to male mold halves are delensed using ultrasonic unit; molded unprocessed embedded silicone hydrogel contact lenses adhered to female mold halves are delensed are manually from lens-adhered female mold halves.

The delensed unprocessed embedded silicone hydrogel contact lenses can be extracted with a mixture of 50:50 of propylene glycol:water. Preferably, the delensed unprocessed embedded silicone hydrogel contact lenses are subjected to the following extraction/hydration, coating, autoclave processes as follows. The unprocessed embedded silicone hydrogel contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon and are examined for delamination according to the procedures described in Example 1. The results are reported in Table 6.

TABLE 6

| | Embedded SiHy Contact lenses | | | | | | |
|---|---|---|---|---|---|---|---|
| SiHy Lens Formulation # | 1 | 1 | 1 | 4 | 4 | 4 | 3 | 2 |
| Insert Formulation # | 1 | 2 | 3 | 1 | 2 | 3 | 1 | 1 |
| Delamination | Yes | Yes | Yes | No | No | No | No | No |

All the publications, patents, and patent application publications, which have been cited herein above in this application, are hereby incorporated by reference in their entireties.

What is claimed is:

1. An insert for being embedded in a silicone hydrogel contact lens, comprising a crosslinked polymeric material, which comprises:
   (1) repeating units of at least one silicone-containing polymerizable material;
   (2) repeating units of at least one aryl acrylic monomer; and
   (3) repeating units of at least one vinylic crosslinking agent,
   wherein the sum of the amounts of components (1) and (2) of the crosslinked polymeric material is at least about 70% by weight relative to the total weight of the crosslinked polymeric material, wherein the crosslinked polymeric material in dry state has a glass transition temperature of greater than about 28° C., wherein the crosslinked polymeric material in fully hydrated state has a water content of less than about 5% by weight, an oxygen permeability of at least about 60 barrers, and a refractive index of at least about 1.45.

2. The insert of claim 1, wherein said at least one aryl acrylic monomer is a vinylic monomer of formula (I) or (II)

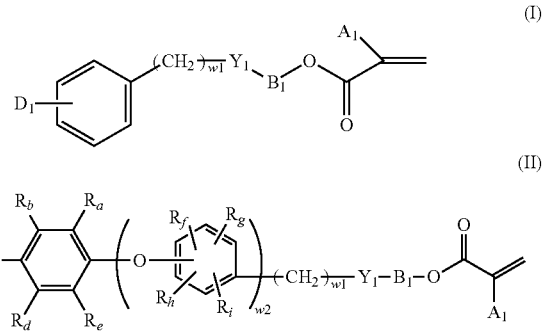

wherein $A_1$ is H or $CH_3$; $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy; w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

3. The insert of claim 2, wherein said at least one vinylic crosslinking agent comprises ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; allyl methacrylate; allyl acrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide, pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, an aryl crosslinking agent, or combinations thereof.

4. The insert of claim 3, wherein said at least one silicone-containing polymerizable material comprises a vinylic monomer having a bis(trialkylsilyloxy)alkylsilyl group, a vinylic monomer having a tris(trialkylsilyloxy)silyl group, a polysiloxane vinylic monomer, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, or combinations thereof.

5. The insert of claim 3, wherein said at least one silicone-containing polymerizable material comprises a vinylic monomer of formula (M1) or (M2)

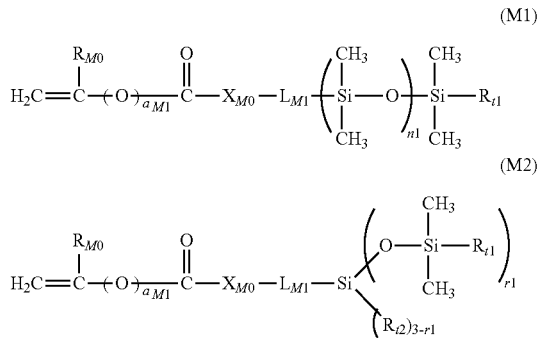

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

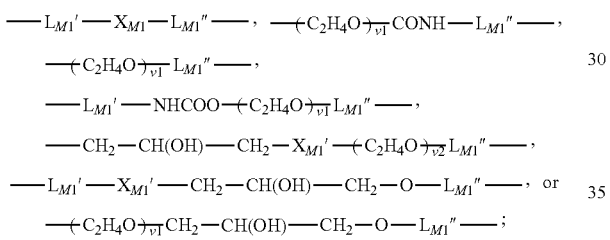

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_{M1}$; v1 is an integer of 1 to 30; v2 is an integer of 0 to 30; n1 is an integer of 3 to 40; and r1 is an integer of 2 or 3.

6. The insert of claim 5, wherein said at least one silicone-containing polymerizable material comprises at least one first polysiloxane vinylic crosslinker.

7. The insert of claim 6, wherein said at least one first polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinyl-carbamate groups.

8. An embedded silicone hydrogel contact lenses, comprising: a silicone hydrogel material; and an insert of claim 1 within the silicone hydrogel material, wherein the silicone hydrogel material is a crosslinked material that has a polymer matrix and comprises (a) repeating units of at least one second silicone-containing vinylic monomer and/or at least one second silicone-containing vinylic crosslinker and (b) repeating units of at least one hydrophilic vinylic monomer, wherein the embedded silicone hydrogel contact lens in fully hydrated state has a water content of from about 15% to about 70% by weight of water when being fully hydrated.

9. The embedded silicone hydrogel contact lens of claim 8, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

10. The embedded silicone hydrogel contact lens of claim 9, wherein the silicone hydrogel material comprises repeating units of at least one second silicone-containing vinylic monomer of formula (M1) or (M2)

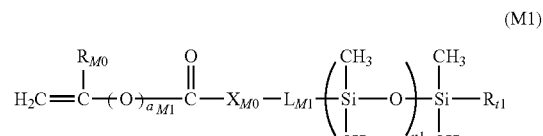

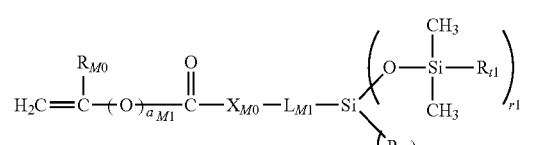

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

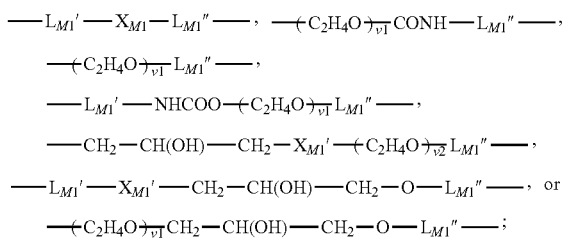

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_{M1}$; v1 is an integer of 1 to 30; v2 is an integer of 0 to 30; n1 is an integer of 3 to 40; and r1 is an integer of 2 or 3.

11. The embedded silicone hydrogel contact lens of claim 10, wherein the silicone hydrogel material comprises repeating units of at least one second polysiloxane vinylic crosslinker.

12. The embedded silicone hydrogel contact lens of claim 11, wherein said at least one second polysiloxane vinylic crosslinker comprises a vinylic crosslinker of formula (III)

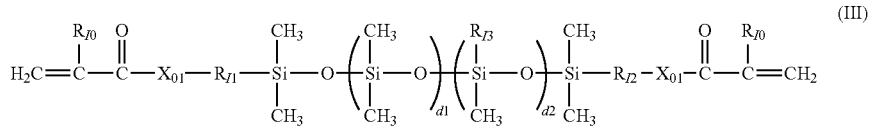

in which:
  d1 is an integer of from 30 to 500 and d2 is an integer of from 1 to 75, provided that d2/d1 is from about 0.035 to about 0.15;
  $X_{01}$ is O or $NR_{IN}$ in which $R_{IN}$ is hydrogen or $C_1$-$C_{10}$-alkyl;
  $R_{I0}$ is hydrogen or methyl;
  $R_{I1}$ and $R_{I2}$ independently of each other are a substituted or unsubstituted $C_1$-$C_{10}$ alkylene divalent radical or a divalent radical of $-R_{I4\text{-}0}-O-R_{I5}-$ in which $R_{I4}$ and $R_{I5}$ independently of each other are a substituted or unsubstituted $C_1$-$C_{10}$ alkylene divalent radical;
  $R_{I3}$ is a monovalent radical of any one of formula (IIIa) to (IIIe)

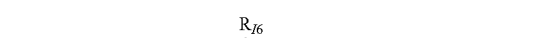  (IIIa)

  (IIIb)

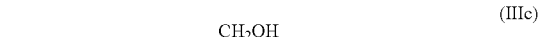  (IIIc)

  (IIId)

  (IIIe)

k1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydroxymethyl;
$R_{I11}$ is hydroxyl or methoxy;
$X_{I1}$ is a sulfur linkage of —S— or a tertiary amino linkage of $-NR_{I12}-$ in which $R_{I2}$ is $C_1$-$C_1$ alkyl, hydroxyethyl, hydroxypropyl, or 2,3-dihydroxypropyl; and
$X_{I2}$ is an amide linkage of

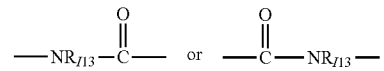

in which $R_{I13}$ is hydrogen or $C_1$-$C_{10}$ alkyl.

13. The embedded silicone hydrogel contact lens of claim 11, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

14. The embedded silicone hydrogel contact lens of claim 11, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth) acrylamide having a number average molecular weight of up to 1500, and combinations thereof; (8) a vinyl ether monomer selected from the group consisting of ethylene glycol monovinyl ether, di(ethylene glycol) monovinyl ether, tri (ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethyammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl(ethyl-2'-(trimethylammonio)-ethylphosphate, 2-(vinyloarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

15. The embedded silicone hydrogel contact lens of claim 14, wherein the silicone hydrogel material comprises repeating units of at least one non-silicone vinylic cross-linking agent.

16. The embedded silicone hydrogel contact lens of claim 15, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)]di-(meth) acrylate, bis[2-(meth)acryloxyethyl]phosphate, trimethylolpropane di-(meth)acrylate, and 3,4-bis[(meth)acryloyl]tetrahydrofuan, diacrylamide, dimethacrylamide, N,N-di(meth) acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

17. The embedded silicone hydrogel contact lens of claim 15, wherein the silicone hydrogel material comprises repeating units of at least one blending vinylic monomer.

18. The embedded silicone hydrogel contact lens of claim 17, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

* * * * *